Figure 1:
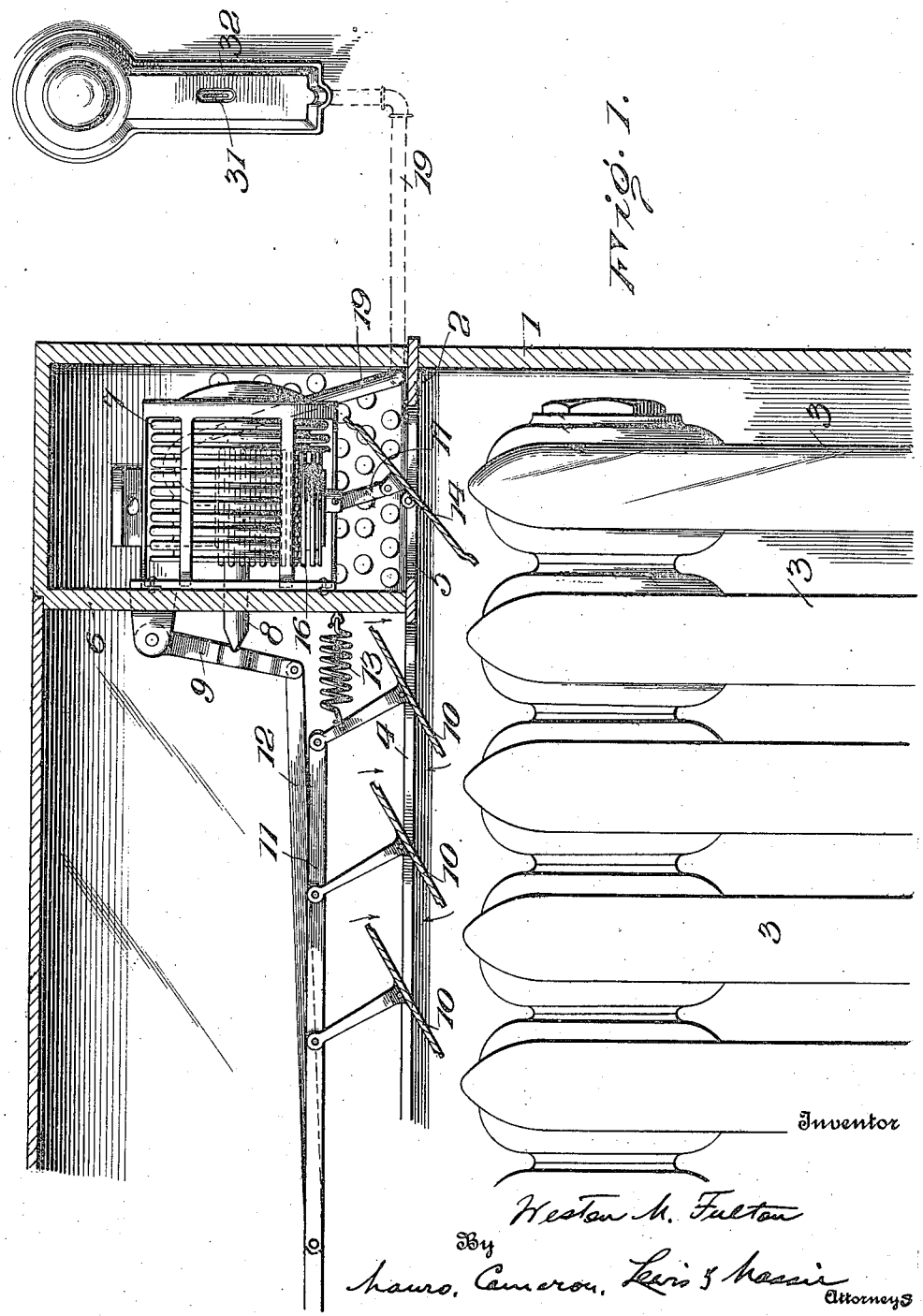

W. M. FULTON.
SYSTEM OF TEMPERATURE REGULATION.
APPLICATION FILED APR. 13, 1915.

1,181,443.

Patented May 2, 1916.
2 SHEETS—SHEET 1.

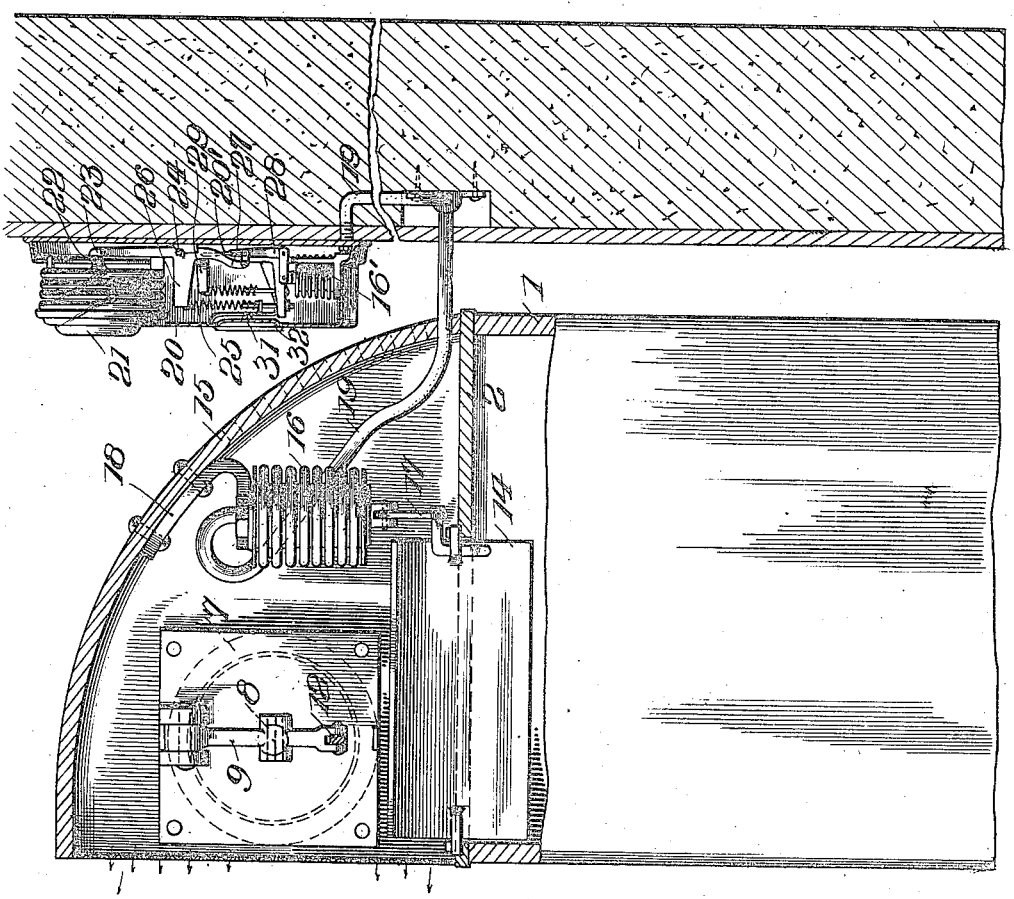

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

SYSTEM OF TEMPERATURE REGULATION.

1,181,443.    Specification of Letters Patent.    Patented May 2, 1916.

Application filed April 13, 1915. Serial No. 21,106.

*To all whom it may concern:*

Be it known that I, WESTON M. FULTON, (whose post-office address is care of The Fulton Company, White avenue and Second street, Knoxville, Tennessee,) have invented a new and useful Improvement in Systems of Temperature Regulation, which invention is fully set forth in the following specification.

This invention relates to temperature regulation by means of thermostats, and more particularly to devices of this class in which a thermostat operates a damper controlling current of air passing over a radiator or other heating means, and has for its object to enable such thermostat to deliver greater power for operating the dampers while securing more delicate regulation of the temperature of the room or space heated.

Where radiators are provided with casings having dampers for controlling the flow of air over the heated coils, it is not infrequent to operate such dampers by means of a thermostat which is subject to the variations of room temperature. Such thermostats have proved effective for operating the dampers where the radiators are short and the resistance of the dampers is small. With long radiators the size and number of the dampers are correspondingly increased and often offer greater resistance to movement by the thermostat than can be overcome by the power developed from the slight variations of room temperature which has heretofore been relied upon for operating the thermostat. A thermostat presupposes a variation of temperature for its operation and the power developed by such a device varies with the range of temperature variation. Since it is desirable to have the variation of temperature within the room as small as possible, a thermostat operating under such conditions develops less and less power as a constant room temperature is approached. For this reason the field of usefulness of the thermostat for directly operating radiator casing dampers has heretofore been limited to small radiators and to locations where the variations of room temperature were sufficiently wide to operate the device.

My invention overcomes the above objections and resides in providing means by which radiator casing dampers of any number and size may be thermostatically operated under the control of room temperature, which is kept between limits too narrow to be effective in operating the dampers under the old system of regulation and without the aid of an extraneous source of power, such as air or other fluid under pressure. This means consists in providing a primary thermostat which is subject to variations of room temperature and which is adapted to control the flow of a stream of air, heated to a higher temperature than that of the room, in the path of which is a secondary or relay thermostat for operating dampers or valves controlling the source of heat. By this system ample power for operating heavy dampers is obtained while retaining their control by a sensitive room thermostat.

In order that the invention may be more readily understood, reference is had to the accompanying drawings, showing by way of example one mechanical embodiment of the inventive idea, but such drawings are intended as illustrations to assist the description of the invention and not for the purpose of defining the limits thereof.

Figure 1 is a view partly in elevation and partly in section, showing my improvements in connection with a damper controlled radiator casing, and Fig. 2 is a view showing the end of the radiator casing with its wall partly broken away to expose the interior construction and also showing at the right the interior arrangement of the thermostat and its hydraulic power connection with parts inside the radiator casing.

Referring to the drawings, 1 is a portion of a radiator casing divided by a horizontal partition 2 into a compartment for receiving the heating coils 3 and a hood above communicating therewith through damper controlled openings 4, 5. A vertical transverse partition 6 near one end of the hood and preferably over the inlet end of the radiator separates off a space in the hood for the reception of an auxiliary or relay thermostat 7 which is of the collapsible and expansible vessel type, having hermetically sealed therein a fluid adapted to operate the vessel at a temperature of about 140° F. The frame of the vessel is preferably supported on the partition 6 through which the power transmitting rod 8, attached to the movable end wall of the vessel, passes and engages a hinge supported link 9 for operating a series of dampers 10 connected thereto by damper operating levers 11, 12. A spring 13 normally acts against the thrust of rod 8 to move the dampers 10 into closed position. In the floor of the thermostat compartment is a damper 14 which controls the admission to the compartment of heated air in the radiator casing. Openings 15 in the hood wall permit this air to escape after passing in contact with the thermostat 7. Damper 14 is operated by a hydraulic power device consisting of a collapsible and expansible vessel 16 having a link connection 17 with damper 14 which is preferably supported inside the hood casing by a suitable bracket 18 secured to the wall of the hood. The vessel 16 is connected through a conduit 19, a part of which may be concealed in the wall of the building, as indicated in Fig. 2, with a similar vessel 16' under the control of a second or room thermostat 20 located at some convenient distance from the radiator and where it will be affected by the average room temperature. Both vessels 16, 16' and the connecting conduit are filled with oil or other suitable liquid.

The room thermostat for operating the hydraulic power transmission may be of any suitable type, but I prefer to use the thermostatic device described and claimed in my co-pending application, Serial No. 20,757, filed April 12, 1915, because of its capability of giving very close regulation of temperature of the room. Only so much of the device is herein described and shown as is necessary to an understanding of its operation in connection with the present invention. The thermosensitive element of this device consists of a corrugated expansive and collapsible vessel 21, the movable inflexible end of which is provided with a plunger 22 terminating in a knife edge which engages the end of one arm 23 of a multiple-arm bell-crank lever fulcrumed at 24. A main spring 25 acting through arms 26 and 23 of the bell-crank lever holds the end wall of the vessel against outward movement till a predetermined fluid pressure accumulates in the thermostatic vessel 21, which will then continue to move through its full stroke with the slight excess of pressure over that required to start it. When the spring pressure of spring 25 is overcome by the vapor pressure in vessel 21, power is transmitted through the third arm 27 of the bell-crank lever to a second bell-crank lever pivoted at 28, one arm of which is pivotally connected to the movable end of vessel 16' and the other arm of which is acted on by a spring pressed member 29 through a toggle-joint connection 20', one function of which is to compensate the resiliency of the walls of the thermostat 21. The thermostat vessel 21 can be set to operate at any predetermined room temperature by adjustment of the index finger 31, secured to one end of spring 25, and which is adapted to move along a graduated scale 32 appearing in the face of the thermostat casing in Fig. 1.

The operation of my improvement is as follows: Assume, for convenience of the description, that the room and the radiator are cold. The thermostatic vessel 21 is now collapsed, the vessel 16' is extended, and the vessel 16 is collapsed and is holding the damper 14 open which controls the opening between the radiator casing and the hood chamber in which the relay or secondary thermostat 7 is located. Under these conditions, thermostat 7 is also collapsed and holds in closed position all the dampers 10 which control the flow of heated air over the radiators and through the hood chamber above the dampers. Steam or hot water is now admitted to the radiator coils and raises the temperature of the first coil over which the relay thermostat is located in advance of the succeeding coils and heats the air around this coil. The heated air ascends through opening 5 and circulates around thermostat 7, and escapes through openings 15 in the back of the hood wall, thereby causing expansion of the thermostatic vessel and movement of plunger 8 to the left to open dampers 10. Before the last radiator coil is heated, the dampers have thus been fully opened to permit the maximum flow of heated air past the radiator coils and to the room to be heated. The room temperature rises till the temperature reaches the predetermined point, say 75° F., at which point the room thermostat 20 is set to operate. At this temperature, plunger 22 acts to depress arm 23 and lift arm 27 from its depressed position into a horizontal position, after which its upward movement is hastened by the action of toggle connection 20' and spring pressed member 29. As a result of this upward throw of arm 27, the end of vessel 16' is pushed downward by its bell-crank connection with arm 27. The collapse of vessel 16' expels liquid contained therein which flows through conduit 19 into vessel 16 located in the hood and extends the latter vessel, the movable end of which is connected through link 17 with damper 14 which is moved into closing position. The flow of hot air around secondary or relay thermostat 7 is now cut down or entirely cut off. The hot air escapes through openings 15, and the compartment containing thermostat 7 cools down to near the room temperature. The thermostat 7 immediately collapses closing the series of dampers 10 and cutting off egress of hot air to the room, the temperature of which now falls. Immediately after the room temperature drops below 75° F., primary thermostat vessel 21 soon collapses. The movements of the lever connections are reversed, vessel 16' extends, liquid flows from vessel 16, thereby enabling it to lift link 17 and open damper 14. Hot air between 180° and 210° F. from the radiator casing again circulates around thermostat 7 and heats it to its operating temperature, and the cycle is repeated. It is to be noted that the temperature of the air which is turned on to the secondary or relay thermostat exceeds that necessary to render the thermostat action by about 40° to 70° F. This excess of heat gives great power to the thermostat and enables it to act positively and quickly at all times.

Instead of arranging the primary thermostat to close damper 14 on expansion, it is apparent that it might be arranged to open damper 14, in which case the secondary or relay thermostat would expand and could be so connected with dampers 10 to close them, and it is obvious that such changes could be made without departing from the scope of my invention.

What is claimed is:

1. In combination, a radiator provided with a damper controlled casing, a primary thermostat responsive to changes of temperature in a space heated by said radiator, a secondary thermostat having connections with said dampers to operate the same and normally exposed to a current of air heated by passing over said radiator, and means operated by said primary thermostat for controlling the flow of said air current around the secondary thermostat.

2. In combination, a radiator provided with a damper-controlled casing, said casing having a damper-controlled compartment through which heated air within the casing may circulate, a thermostat responsive to variations of temperature in a room heated by said radiator, a second thermostat located in said hot air circulating compartment for operating the casing dampers and connections between the room thermostat and the compartment damper for controlling the flow of heated air around the second thermostat.

3. In combination, a radiator provided with a damper-controlled casing, said casing having a compartment located above the intake end of the radiator and through which heated air within the casing may circulate, a thermostat responsive to variations of temperature in a room heated by the radiator, a second thermostat located in said hot air circulating compartment and having connections with the casing dampers, and means operated by the first-named thermostat for controlling the flow of air around said second thermostat.

4. In combination, a sectional radiator housed by a damper controlled inclosure, a primary thermostat subject to variations of room temperature, a secondary thermostat having connections with said dampers and located in a compartment of said inclosure above the intake section of said radiator, a damper controlled opening for communication between said inclosure and compartment, and fluid piston means under control of said primary thermostat for operating said damper to control the flow of heated air through said compartment.

5. In combination, a radiator housed within a damper controlled inclosure, a primary thermostat responsive to changes of temperature in a space heated by said radiator, a secondary thermostat having connections with said dampers to operate the same and normally exposed to a current of air heated by said radiator, and a conduit terminating at one end by a collapsible and expansible vessel operated by said primary thermostat and terminating at the opposite end by a similar vessel having connection with a damper for controlling the flow of said heated air around the secondary thermostat.

6. In combination, a primary thermostat exposed in a space to be maintained at a constant temperature, a secondary thermostat for controlling the source of heat in said space, and means under the control of the primary thermostat for circulating air around said secondary thermostat at temperature above the predetermined room temperature for controlling the source of heat in said space.

In testimony whereof I have signed this specification in the presence of two subscribing witnesses.

WESTON M. FULTON.

Witnesses:
P. J. HOLBROOK,
H. S. McCOY.